United States Patent [19]
Gurev et al.
[11] 3,735,484
[45] May 29, 1973

[54] NON-CORROSIVE COATING FOR THIN ALUMINUM METALLIZATION

[75] Inventors: Harold S. Gurev, Paradise Valley; Ralph W. Kirk, Phoenix, both of Ariz.
[73] Assignee: Motorola, Inc., Franklin Park, Ill.

[22] Filed: Dec. 17, 1970
[21] Appl. No.: 99,012

[52] U.S. Cl. ....................29/588, 29/590, 148/6.15
[51] Int. Cl. ....................B01j 17/00
[58] Field of Search....................29/588, 589, 590; 148/6.15; 117/212

[56] References Cited

UNITED STATES PATENTS 3,632,433 1/1972 Tokuyama....................317/234
3,621,563 11/1971 Gee....................29/588
3,415,766 12/1968 Sedlicka....................148/6.15

*Primary Examiner*—Charles W. Lanham
*Assistant Examiner*—W. Tupman
*Attorney*—Mueller and Aichele

[57] ABSTRACT

To prevent corrosion of aluminum metallization of semiconductor devices, the device, including the aluminum metallization thereof is phosphated with a phosphate solution that includes no sodium. The phosphating may take place before the leads are provided or after. Portions of the phosphated surface may be covered by deposited glass. Then the phosphated semiconductor device or IC may be encapsulated in a plastic material in a known manner.

4 Claims, 3 Drawing Figures

PATENTED MAY 29 1973 3,735,484

INVENTOR.
Harold S. Gurev
Ralph W. Kirk
BY Mueller & Aichele
ATTY'S.

NON-CORROSIVE COATING FOR THIN ALUMINUM METALLIZATION

BACKGROUND

It is known that when a prior art plastic encapsulated integrated circuit or a discrete device, hereinafter IC, was subjected to an atmosphere of 85 percent relative humidity at 85° C continually for a thousand hours, the IC failed. This failure was found to be due to the fact that moisture seeped into the package, apparently along the lead thereof, and reached the aluminum used as bonding pads of the IC and other aluminum parts. It is thought that this moisture, together with the phosphorous present in the encapsulated device, this phosphorous being present due to the use of phossil (phosphorous containing) glass to passivate the IC, formed phosphoric acid. This phosphoric acid so corroded the aluminum as to form open circuits in the package and so destroyed the IC. While several avenues of correction of this condition such as preventing seeping of water into the IC, or removing the leachable phosphorous from the IC, were evident, the avenue of increasing the corrosion resistance of the IC before packaging and even before applying the leads thereto, was studied.

One way of preventing corrosion of wrought or thick sections of aluminum is by phosphating with a solution that includes sodium. As is known, sodium ions cause device instability in IC's that cause undesired current flow and so destroys or greatly decreases the usefulness of an IC. As far as is known, phosphating of very thin sections of aluminum such as those found in IC's has not yet been done.

It is an object of this invention to provide a method of producing IC's in which the aluminum metallization thereof is not corroded by any moisture that may seep into the package.

It is a further object of this invention to increase the corrosion resistance of the aluminum metallization of an IC without danger of producing surface inversion.

SUMMARY

In accordance with the invention, the aluminum metallization of an integrated circuit or a discrete device is made non-corrosive by phosphating the circuit or device with a phosphating solution that includes phosphoric acid but includes no sodium. The method of coating consists in dipping the IC either before or after the leads are attached, but before the IC is packaged, in a cleaning solution which preferably contains no sodium ions. Then the IC is rinsed. Then the IC is dipped in the phosphating solution for 30 seconds at 60° C and then the IC is again rinsed, after which the IC is baked.

DESCRIPTION

The invention will be better understood upon reading the following description in connection with the accompanying drawing in which.

Figure 1:
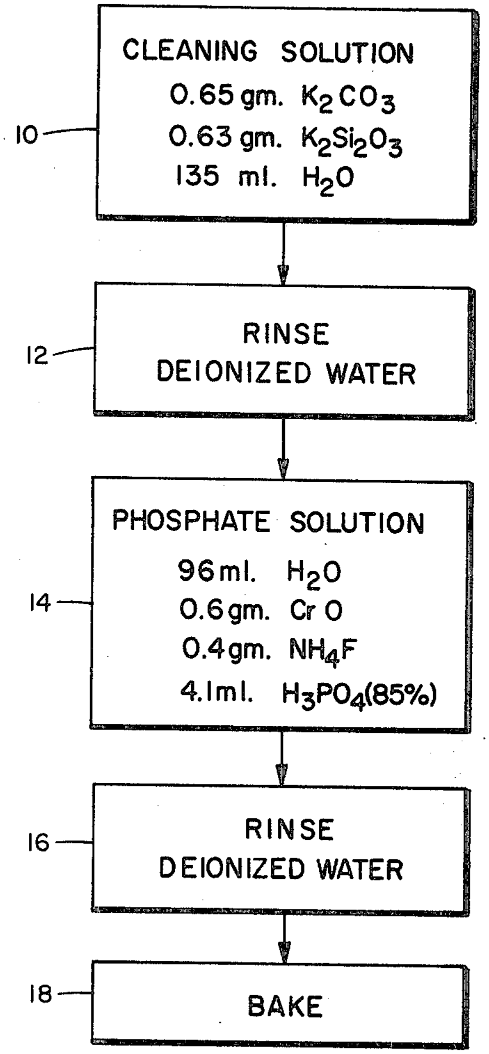
FIG. 1 illustrates steps of the method of this invention.

First, any IC, being in the form of a chip or in the form of a wafer, and if it is in the form of a chip, whether the leads are attached thereto or not, is dipped in a cleaning solution 10 for 5 minutes at 60°C. A suitable cleaning solution may be 0.65 grams of $K_2CO_3$, 0.63 grams of $K_2Si_2O_3$ and 135 ml. of $H_2O$. Then the cleaned IC is rinsed in running deionized water 12. Then the IC is dipped in the phosphate solution 14, which contains no sodium, for 30 seconds at 60°C. A suitable phosphating solution is 96 ml. of $H_2O$, 0.6 gm of CrO, 0.4 gm $NH_4F$ and 4.1 ml. of $H_3PO_4$ (85%). Then the dipped IC is rinsed in running deionized water 16. Then the IC is baked as indicated by the rectangle 18 for 10 minutes at 70° to 100°C. All components of the cleaning and phosphating solution may be varied in amount by about ±15 percent. Furthermore, the temperature and the time of exposure to the various steps may be varied within ±15 percent.

If a conductor 24 whether it be of phosphated or not-phosphated aluminum is bonded by thermocompression or ultrasonic bonding to the so phosphated bonding pad 22 of an IC 20, the phosphating having been provided in a manner described above, the resultant product is corrosion resistant, both in the aluminum and in the junction between the aluminum lead and the aluminum pad, and the bond formed between the phosphated aluminum pad and any aluminum wire whether phosphated or not that is bonded thereto, is mechanically strong and provides a low resistance ohmic contact. However, it has been found that if the phosphated aluminum surface is scratched deep enough to penetrate the phosphated layer, then the aluminum corrodes rapidly. Therefore, the leads and the substrate may be separately phosphated and then thermocompression bonded and also in accordance with this invention, the conductive lead may be bonded to the aluminum bonding pads before either is phosphated and then the IC with the leads attached thereto may be all phosphated in one piece as described hereinabove, resulting in a corrosion resistant assembly. Unphosphated leads may also be bonded to phosphated bonding pads.

It has also been found that the described phosphating method may be applied to a wafer before it is broken, in a known manner, into a plurality of chips, or the phosphating method may be applied to the individual chips before or after the leads are attached.

After phosphating, as described, the chip, with its leads is completed by packaging in a known manner as by plastic encapsulation. The resultant packaged IC successfully withstands the exposure test of exposing it to 85 percent humidity at 85° C for 1,000 hours continually or more.

Figures 2, 3:
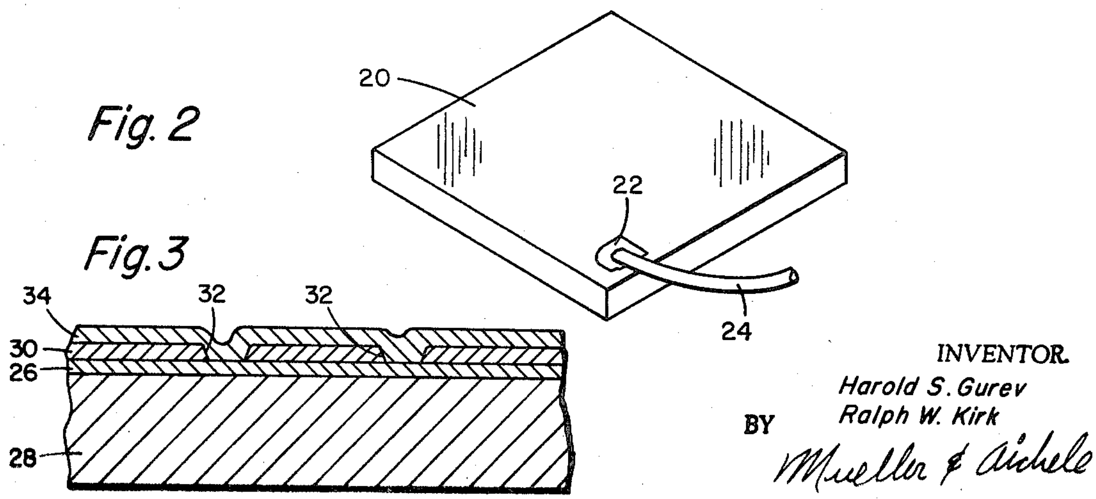
FIG. 2 illustrates the step of attaching a lead to a phosphated bonding pad.
FIG. 3 illustrates making connections to phosphated aluminum through etched holes in an insulating layer.

The phosphating method described above presents the following additional advantages in addition to reducing the corrosion thereof. If it be desired to provide a connection to an aluminum pad on the IC either by wire bonding or by contact to an overlaying metal thin film by etching a hole in a glass layer overlaying the aluminum pad then, due to the corrosion protection provided by the described phosphating method, the time during which the IC is exposed to the etchant for the glass layer is no longer critical. Therefore, a great many holes may be etched in a glass layer overlaying phosphated aluminum bonding pads simultaneously and the etching time may be chosen long enough so that all the holes in the glass will be etched out without danger of etching the aluminum pads so deeply as to make it difficult or impossible to apply bonds thereto or without danger of reducing aluminum cross section sufficiently to cause device service failure due to excessive current density or without danger of losing ohmic contact between the metal thin films by the presence of tenacious interlayer insulating thin films. This is illustrated in FIG. 3 in which a layer of aluminum 26 has been deposited on the substrate 28, and the surface of the aluminum has been phosphated as disclosed hereinabove. Then an insulating layer 30 of $SiO_2$ or other suitable dielectric is deposited on the phosphated layer and holes 32 are etched in the layer 30. As noted above, the etching time is not critical and may be long enough so as to be sure that all the holes 30, (only two being shown) are etched through to the phosphated surface of the aluminum 26. Then another layer or connector 34 of aluminum may be provided over the insulated layer 30 and make good connections to the aluminum 26 at the bottom of as many holes 32 as is desired.

While a useful cleaning solution has been described, other cleaning solutions may be used. In fact, a cleaning solution which included sodium therein has been used and the resultant phosphated product was not corrosive and the sodium was washed away and did not produce surface instability.

What is claimed is:

1. The method of phosphating a semiconductive device including thin aluminum layers to produce corrosion resistance of the aluminum layers which comprises dipping the device in a cleaning solution of about 0.65 grams of potassium carbonate, about 0.63 grams of potassium silicate, about 135 milliliters of water for about 5 minutes at about 60°C, rinsing in deionized water, dipping in a phosphating solution which comprises about 95 milliliters of water, about 0.6 grams of CrO, about 0.4 grams of ammonium fluoride and about 4.1 milliliters of phosphoric acid 85 percent for about 30 seconds at about 60°, rinsing in deionized water, baking for about 10 minutes at about 85°C, all weights and times and measures being within about ±15 percent, and bonding a wire to said phosphated semiconductive device, whereby a non-corrosive mechanically strong, low resistance ohmic junction is formed.

2. The method of claim 1 in which said bonding is by thermal compression.

3. The method of claim 1 in which said bonding is ultrasonic.

4. The method of claim 1 and further including the step of covering the phosphated device with an insulating coating, etching holes through said coating and making at least one electrical connection to said phosphated device through a hole.

* * * * *